Sept. 2, 1969          R. S. TEN EYCK          3,465,131
METALLIC CODED CARD WITH MAGNETIC REED SWITCH READER
Filed May 27, 1966          2 Sheets-Sheet 1
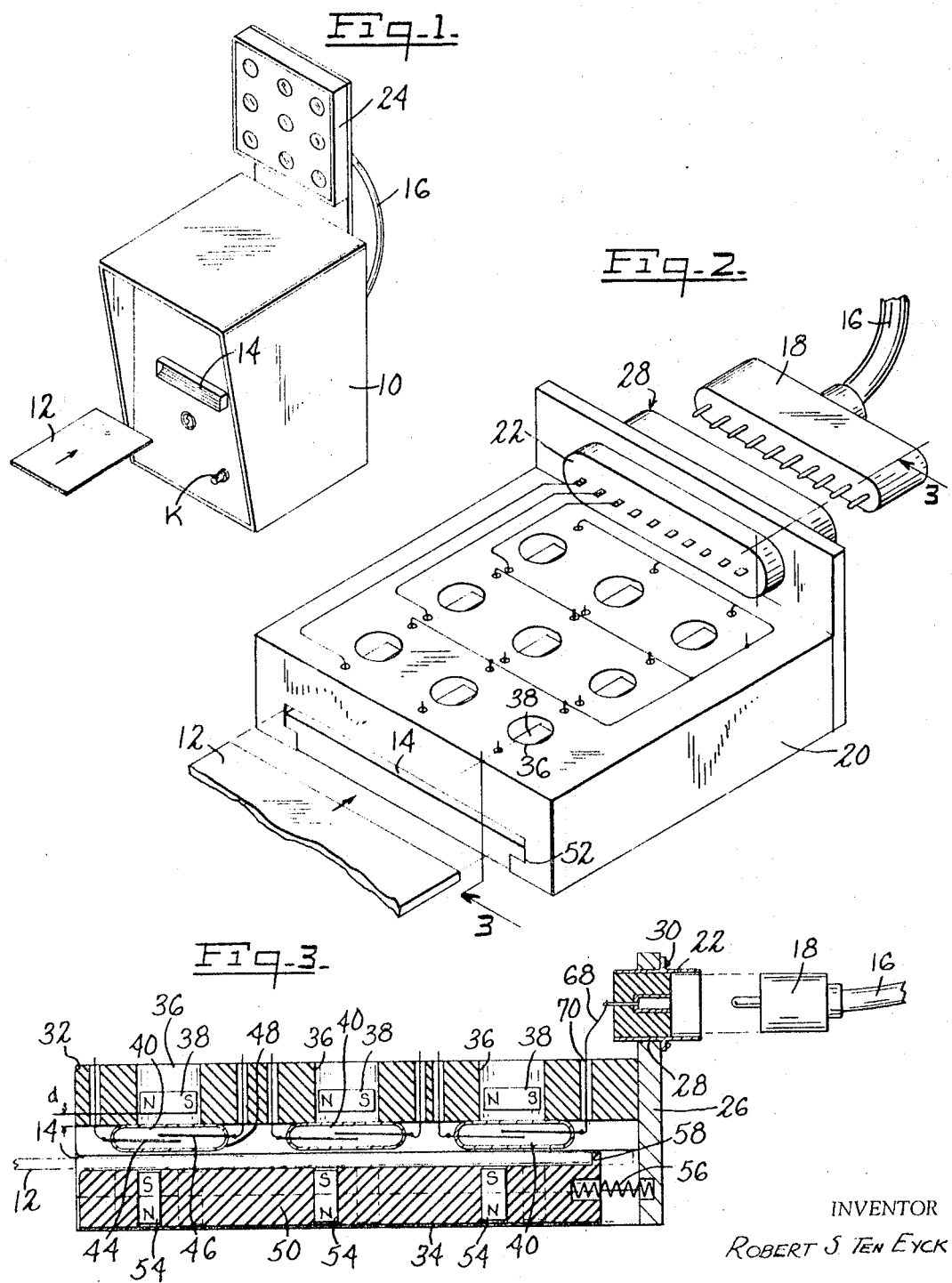
INVENTOR
ROBERT S. TEN EYCK
BY Alan E. Steele
ATTORNEY Sept. 2, 1969   R. S. TEN EYCK   3,465,131
METALLIC CODED CARD WITH MAGNETIC REED SWITCH READER
Filed May 27, 1966   2 Sheets-Sheet 2
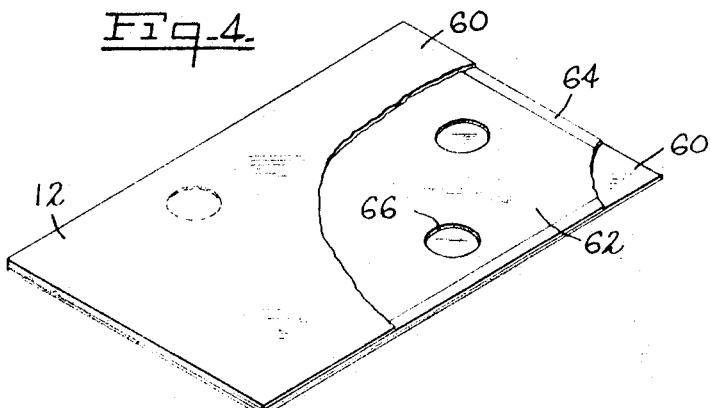
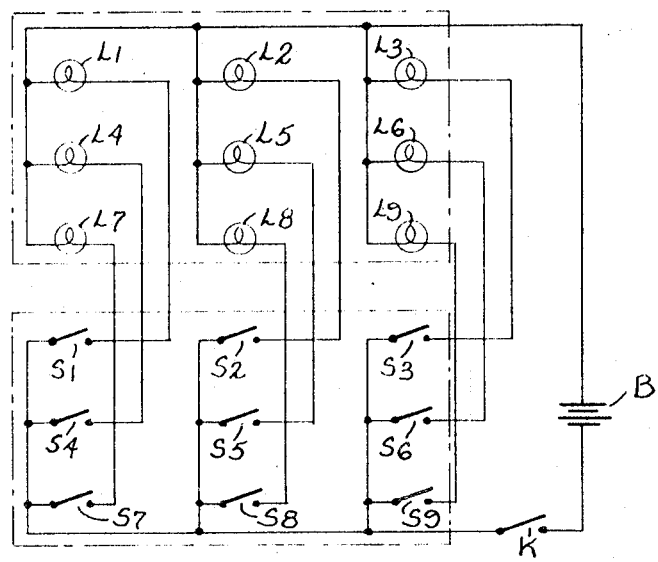
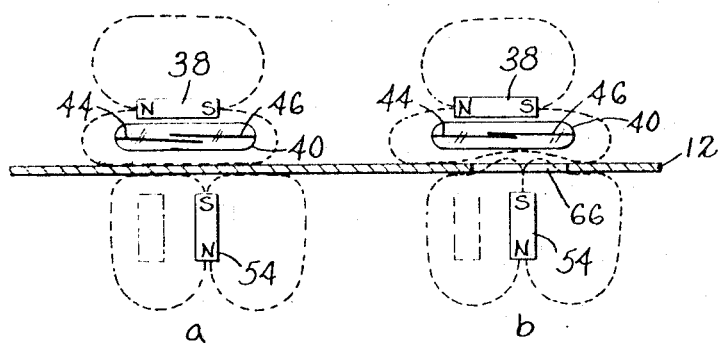
INVENTOR
ROBERT S. TEN EYCK
Alan E. Steele
ATTORNEY United States Patent Office 3,465,131
Patented Sept. 2, 1969

3,465,131
METALLIC CODED CARD WITH MAGNETIC REED SWITCH READER
Robert S. Ten Eyck, 617 Highland Ave.,
Middletown, Conn. 06457
Filed May 27, 1966, Ser. No. 553,433
Int. Cl. G06k 7/08
U.S. Cl. 235—61.11            5 Claims

ABSTRACT OF THE DISCLOSURE

This is an identification card sensing device for use with a laminated plastic card having a sandwiched coded strip of metal foil. The card is inserted on a slidable tray having an array of magnets suitably arranged therein and said tray is then moved beneath an array of reed switches, each having another magnet associated therewith. The interaction of the field of each associated pair of magnets is affected by the coding openings in the foil causing the reed switches to react to said coding and "scan" the card.

---

This invention relates to a coded card and card reading system to be utilized in security systems, automatic dispensing systems and more particularly security identification systems, and credit card validation and recording for automatic dispensing.

The object of this invention is to provide an improved and simplified system for coding, reading and recording identification and credit cards. These cards carry their own intelligence in the form of a coded strip of metallic foil sandwiched between the front and reverse sides of a card, the whole card being normally laminated between plastic surfaces. The strip of metallic foil is coded by removing portions thereof in accordance with a desired coded pattern. Upon inserting this card into the reading system, the code is read to compare it with a number on the card for security purposes, or the information read may be relayed to a recording and computer unit in the case of automatic dispensing by use of credit cards.

A further object of this invention is to provide a coded card which cannot be desensitized or have its intelligence removed by shock, moisture or exposure to the elements during normal use.

Still a further object of this invention is to provide a simple card reading system which decodes the information on the card inserted therein and displays the information contained on said card, or relays this information to a recording and/or computer system.

More specifically this invention utilizes a series of magnetic latching reed switches in the card reading system biased by a permanent magnet which is insufficiently strong to close the switch and is activated by one pole of another permanent magnet juxtapositioned from the biasing magnet. Areas of the coded card which do not have portions removed from the metallic strip, shunts the flux from the activating magnet thereby keeping the reed switches in its area open.

Therefore a more specific object of this invention is to provide a more simplified magnetically activated card reading system with a nonmagnetic coded card.

The objects and advantages of the invention will become apparent from the following description taken in conjunction with the accompanying drawings in which:

FIGURE 1 is a perspective view of the card reader with the card about to be inserted and a visual reading panel.

FIGURE 2 is a section of the internal portion of the card reader.

FIGURE 3 is a view of a section taken along the line 3—3 through the internal portion of the card reader in FIGURE 2.

FIGURE 4 is a perspective view of the card, showing a fragmentary portion of the top layer removed.

FIGURE 5 is a wiring diagram for the card reader and readout system.

FIGURE 6 is a diagrammatic representation of the operation of the reed switches with the card inserted in the card reader.

Referring now to FIGURES 1 and 2, there is shown a card reader 10, with the card 12 being inserted in slot 14 of the card reader 10. A cable 16 having a plug 18 at one end which is attached to receptacle 22, and attached at the other end to a display panel 24, carrys information from card reader core 20, to said display panel 24. Receptacle 22 is attached to the back panel 26 of card reader core 20, by engaging oval slot 28 and fastened to back panel 26 by screws 30. The card reader core 20 is made up of an upper half 32 and a lower half 34, both halves being separated by card slot 14. The upper half 32 has a series of apertures 36, with permanent biasing magnets 38 snugly situated therein. As shown in FIGURE 3, the polar axis of the magnet is parallel to the horizontal plane of the card reader core 20, however, its axis may be perpendicular to the horizontal plane in order to save space in the reader. The polarity of these magnets are as designated in FIGURE 3. Situated in an opening just below each aperture 36, is a reed switch 40 whose vertical centerline is coincident to that of the biasing magnet 38. The biasing magnet 38 is positioned a given distance $d$, above the reed switch 40 by cementing it in place to the sides of aperture 36. Reed switch 40, comprises two cantilevered beams of magnetic alloy, reeds 44 and 46, enclosed in a glass envelope 48, the fixed ends of the reeds 44, 46 are supported by being sealed at their ends in the glass envelope 48. The free ends of the reeds, 44, 46, overlap and are separated by a small gap. The sealing of glass envelope 48 about the fixed ends of reeds 44, 46, hold them in a predetermined position. Lead wires 68, are attached to the fixed ends of the reeds 44, 46, on the outside of glass envelope 48, and are wired through holes 70 to receptacle 22.

The positioning of the biasing magnet 38 a given distance $d$ from normally open reed switch 40, induces weak S and N polarities in reeds 44, 46, respectively where they are of insufficient strength to be attracted to one another and thereby the reed switch 40, remains open.

Lower half 34 of core card reader 20, has a slidable portion 50 whose cross section is in the shape of a tongue, which slides in a grooved portion 52 of the lower half of the core card reader. Positioned in slots in slidable portion 50 are permanent activating magnets 54 whose polar axes are perpendicular to the horizontal plane of the card reader core 20. As illustrated the activating magnets are positioned with their S poles directly below the N poles of the biasing magnets 38. This tends to induce a N pole in reed 44, thereby opposing the S pole induced by biasing magnet 38 in reed 44. The effect thereby is to keep reed switch 40 open. A spring 56 is attached to the back end of slidable portion 50 and attached at the other end to back panel 26, so as to urge slidable portion 50 to the position indicated in FIGURE 3. When card 12 is being inserted in slot 14, it engages card stop 58 and upon full insertion it urges sliding portion 50 back against the force of spring 56 unit until it bottoms against back panel 26. The activating magnets 54 are now positioned (dotted portion) so that its S poles are directly in line with the S poles of the biasing magnets 38. Assuming for a moment that the card 12 has a very low permeability, therefore the activating magnets 54 reinforce the strength of the N pole induced on reeds 46 by the biasing magnets 38 sufficiently to cause the reeds to be attracted to each other and close. Upon removal of the card 12, the sliding portion 50 and activating magnets 54 are urged back to their original positions by spring 56 thereby causing the reed switch 40 to open.

The card 12, shown in FIGURE 4, in its simplest form consists of two plastic surfaces 60, having a low permeability, with a coded metallic strip 62 sandwiched between surfaces 60. The surfaces 60 are pressed together about their periphery 64 with the use of heat and/or a proper adhesive to enclose and seal the metallic strip 62 in between these surfaces. One may also place an identification paper of low permeability just beneath the plastic surfaces for visual identification and then seal the plastic surfaces about the metallic strip as previously described. The metallic strip 60 is coded by removing portions of it by punching holes 66, or any pattern of removal desired. The portions are removed so that when the card 12 is inserted into the card reader, the removed portions will fall withing the area of some of the apertures 36.

For simplicity, nine apertures have been shown in the drawings, but one may increase or recrease the number of apertures, depending upon the complexity of the code and readout system desired. A wiring diagram and readout system shown in FIGURE 5 illustrates a simple application of this invention. The nine reed switches 40, are shown as S1, S2 . . . S9 respectively. Each switch is wired to a lamp in the display panel 24 through lead wires 68, receptacle 22, plug 18 and numbered L1, L2 . . . L9 respectively. The circuit receives power from a battery B located in the card reader 10, and is turned on or off by switch K. In operation the switch K is closed, the card 12 is inserted into the card reader 10, via slot 14 engaging card stop 58 and urging the slidable portion 50 against back panel 26. This positions activating magnets 54 so that its S poles are directly in line with the S poles of the biasing magnets 38. The portions of the metallic strip 62 in card 12 which were removed will present a low permeability path to the magnetic flux, as indicated in FIGURE 6b and therefore reinforce the N pole induced on reed 46 and cause reed switch 40 to close. The portions of the metallic strip 62 which were not removed and positions itself between the biasing and activating magnets will shunt the magnetic flux (FIGURE 6a) and the weak N pole induced by biasing magnet 38 will not be reinforced and therefore its associated reed switch 40 will remain open. Those switches which close in accordance with the coding of the card will cause its associated lamps to light on display panel 24. The cards may be coded and the lamps read in numbers to the base 10, so that L1, L4 and L5 will be the hundredths column, L2, L5 and L8 will be the tenths column, and L3, L6 and L9 will be the unit column. The information received from the switches may be relayed to a storage system or a computer, in lieu of the display panel, for recording or initiating an automatic dispensing system. The code itself may be a binary code instead of one to the base 10, which would give you more flexibility and "bits" for a given pattern of reed switches. Upon removing card 12 from the card reader 10, the slidable portion 50 is urged back to its original position by spring 56, and the S poles of the activating magnets are moved opposite the N pole of the biasing magnets, thereby causing all reed switches to open and the system is ready to read the next card which is inserted.

While I have shown, described and pointed out the fundamental features of the invention, it should be evident that alternate forms of the invention will doubtless occur to those skilled in the art and I wish it to be understood, therefore, that all such variations and substitutions within the scope of this invention are intended to be covered by the following claims.

I claim:

1. A card having front and reverse sides with a non-magnetized metallic intelligence carrying element between said front and reverse sides, said intelligence carrying element having portions removed in a codified pattern, a card reader to translate the intelligence carried by said card comprising:
   (a) a stationary housing,
   (b) a plurality of reed switches mounted in said housing,
   (c) each of said reed switches having a first magnet mounted adjacent to one of its sides,
   (d) a member slidably mounted in said housing and being adjacent to the opposite sides of said reed switches,
   (e) a space between said reed switches and said slidable member for inserting said card, and said card when inserted engaging the slidable member to urge it in the direction in which said card is being inserted,
   (f) a second magnet, corresponding with each of said first magnets mounted in said slidable member and having its polar axis' perpendicular to the lateral axis' of said reed switches, whereby movement of said slidable member and said second magnets in relation to said first magnets activates one or more of said reed switches in accordance with the intelligence carried by said card.

2. The card reader as defined in claim 1 in which the polar axis' of said second magnets are perpendicular to the polar axis' of said first magnets.

3. The card reader as defined in claim 2 in which said reed switches are normally open and said first magnets are located a given distance from its corresponding reed switches so as to induce weak magnetic poles in the reeds of said reed switches which are insufficient to close said reed switches.

4. The card reader as defined in claim 3 in which said second magnets are positioned in the slidable member where the poles facing the poles of said first magnets are dissimilar in polarity, and after insertion of the card the poles of said second magnets are moved to align with the poles of the first magnets which are similar in polarity to that of said second magnets.

5. The card reader system as defined in claim 4 in which the movement of said second magnets in relation to said first magnets, where the poles facing each other are of similar polarity, augments the strength of the magnetic poles induced in the reeds of said reed switches so as to be sufficient to close said reed switches.

References Cited

UNITED STATES PATENTS

| 2,547,838 | 4/1951 | Russell | 235—61.12 |
| 2,634,911 | 4/1953 | Wolowitz | 235—61.12 |
| 2,967,916 | 1/1961 | Williams | 200—46 X |
| 3,154,761 | 10/1964 | O'Gorman. | |
| 3,184,563 | 5/1965 | Myatt. | |
| 3,205,323 | 9/1965 | Deshautreaux | 200—87 |
| 3,274,352 | 9/1966 | Ryno et al. | 340—149 X |
| 3,312,372 | 4/1967 | Cooper | 235—61.11 X |

DARYL W. COOK, Primary Examiner

ROBERT M. KILGORE, Assistant Examiner

U.S. Cl. X.R.

200—46; 340—149; 235—61.12